(12) United States Patent
Delp

(10) Patent No.: US 9,576,185 B1
(45) Date of Patent: Feb. 21, 2017

(54) CLASSIFYING OBJECTS DETECTED BY 3D SENSORS FOR AUTONOMOUS VEHICLE OPERATION

(71) Applicant: Toyota Motor Engineering & Manufacturing North America, Inc., Erlanger, KY (US)

(72) Inventor: Michael J. Delp, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/852,806

(22) Filed: Sep. 14, 2015

(51) Int. Cl.
*G06K 9/00* (2006.01)
*G05D 1/02* (2006.01)

(52) U.S. Cl.
CPC ......... *G06K 9/00201* (2013.01); *G05D 1/0242* (2013.01); *G05D 1/0251* (2013.01); *G06K 9/00805* (2013.01)

(58) Field of Classification Search
CPC .. G05D 1/0242; G05D 1/0246; G05D 1/0248; G05D 1/0251; G05D 1/0253; G06K 9/00805
See application file for complete search history.

(56) References Cited

U.S. PATENT DOCUMENTS

| | | | |
|---|---|---|---|
| 6,370,261 B1* | 4/2002 | Hanawa | G06K 9/00805 382/104 |
| 7,042,344 B2 | 5/2006 | Chiba et al. | |
| 7,522,066 B2 | 4/2009 | Galera et al. | |
| 8,379,924 B2* | 2/2013 | Schaufler | G06K 9/00805 382/104 |
| 8,442,713 B2 | 5/2013 | Kim et al. | |
| 8,989,944 B1* | 3/2015 | Agarwal | G08G 1/166 701/23 |
| 9,383,753 B1* | 7/2016 | Templeton | G05D 1/0246 |
| 2008/0063239 A1* | 3/2008 | Macneille | G06K 9/00805 382/104 |

(Continued)

OTHER PUBLICATIONS

Dalton, "Autonomous Vehicle Path Planning with Remote Sensing Data", Student Thesis, Dec. 2, 2008, (75 pages).

(Continued)

*Primary Examiner* — Dale W Hilgendorf
(74) *Attorney, Agent, or Firm* — Christopher G. Darrow; Darrow Mustafa PC

(57) ABSTRACT

A method of autonomous driving includes generating, with a 3D sensor, 3D points representing objects in the environment surrounding a vehicle. The method further includes, with a computing device, identifying, from the 3D points, a temporal series of clusters of 3D points representing the same object in the environment surrounding the vehicle as a track, identifying cluster-based classifiers for the object based on identified local features for the clusters in the track, identifying track-based classifiers for the object based on identified global features for the track, combining the cluster-based classifiers and the track-based classifiers to classify the object, with the cluster-based classifiers being weighted based on an amount of information on the clusters from which they are identified, and with the weight increasing with increasing amounts of information, and driving the vehicle along a route based on the object's classification.

18 Claims, 9 Drawing Sheets

(56) References Cited

U.S. PATENT DOCUMENTS

| | | | | |
|---|---|---|---|---|
| 2010/0202657 A1* | 8/2010 | Salgian | ............ | G06K 9/00805 |
| | | | | 382/103 |
| 2011/0254924 A1* | 10/2011 | Berginc | ............ | G06K 9/00201 |
| | | | | 382/103 |
| 2012/0236122 A1* | 9/2012 | Fukawa | ............ | G06K 9/00805 |
| | | | | 348/148 |
| 2012/0281907 A1* | 11/2012 | Samples | ............ | G06K 9/00805 |
| | | | | 382/159 |
| 2013/0100131 A1* | 4/2013 | Berechet | ............ | G06K 9/00201 |
| | | | | 345/420 |
| 2014/0368807 A1* | 12/2014 | Rogan | ............... | G06K 9/00805 |
| | | | | 356/28 |
| 2015/0177007 A1* | 6/2015 | Su | ....................... | G05D 1/0246 |
| | | | | 701/25 |
| 2016/0003935 A1* | 1/2016 | Stainvas Olshansky | ............ | G01S 13/931 |
| | | | | 342/70 |

OTHER PUBLICATIONS

Anderson et al., "LIDAR density and linear interpolator effects on elevation estimates", International Journal of Remote Sensing, published online Feb. 22, 2007, Retrieved Aug. 21, 2015, (13 pages), Taylor & Francis.

Teichman et al., "Towards 3D Object Recognition via Classification of Arbitrary Object Tracks", 2011, (8 pages).

* cited by examiner

CLASSIFYING OBJECTS DETECTED BY 3D SENSORS FOR AUTONOMOUS VEHICLE OPERATION

TECHNICAL FIELD

The embodiments disclosed herein generally relate to autonomous operation systems for vehicles and, more particularly, to the classification of objects detected by 3D sensors in autonomous operation systems.

BACKGROUND

Some vehicles include an autonomous operation system with an operational mode in which the vehicle is driven along a travel route with minimal or no input from a human driver. In these vehicles, the autonomous operation system is configured to detect information about the environment surrounding the vehicle, including the presence of objects, and process the detected information in order to plan how to drive the vehicle along a travel route while avoiding the objects.

In real world traffic situations, as a part of this detection and planning, it is desirable for the autonomous operation system to classify the objects in the environment surrounding the vehicle in order to account not only for other vehicles, but also for pedestrians and bicycles, among other objects. Improving the autonomous operation system's classification of the objects in the environment surrounding the vehicle is the subject of ongoing research.

SUMMARY

Disclosed herein are systems and methods for autonomous driving. In one aspect, a method of autonomous driving includes generating, with a 3D sensor, 3D points representing objects in the environment surrounding a vehicle. The method further includes, with a computing device, identifying, from the 3D points, a temporal series of clusters of 3D points representing the same object in the environment surrounding the vehicle as a track, identifying cluster-based classifiers for the object based on identified local features for the clusters in the track, identifying track-based classifiers for the object based on identified global features for the track, combining the cluster-based classifiers and the track-based classifiers to classify the object, with the cluster-based classifiers being weighted based on an amount of information on the clusters from which they are identified, and with the weight increasing with increasing amounts of information, and driving the vehicle along a route based on the object's classification.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes an autonomous operation system that, in operation, classifies objects in the environment surrounding the vehicle represented by temporal series of clusters of 3D points, and drives the vehicle along a route based on the objects' classifications. The autonomous operation system classifies the objects based on both a track-based classifier and cluster-based classifiers, but weighs the cluster-based classifiers based on the amount of information on the clusters from which they are identified.

Figure 1:
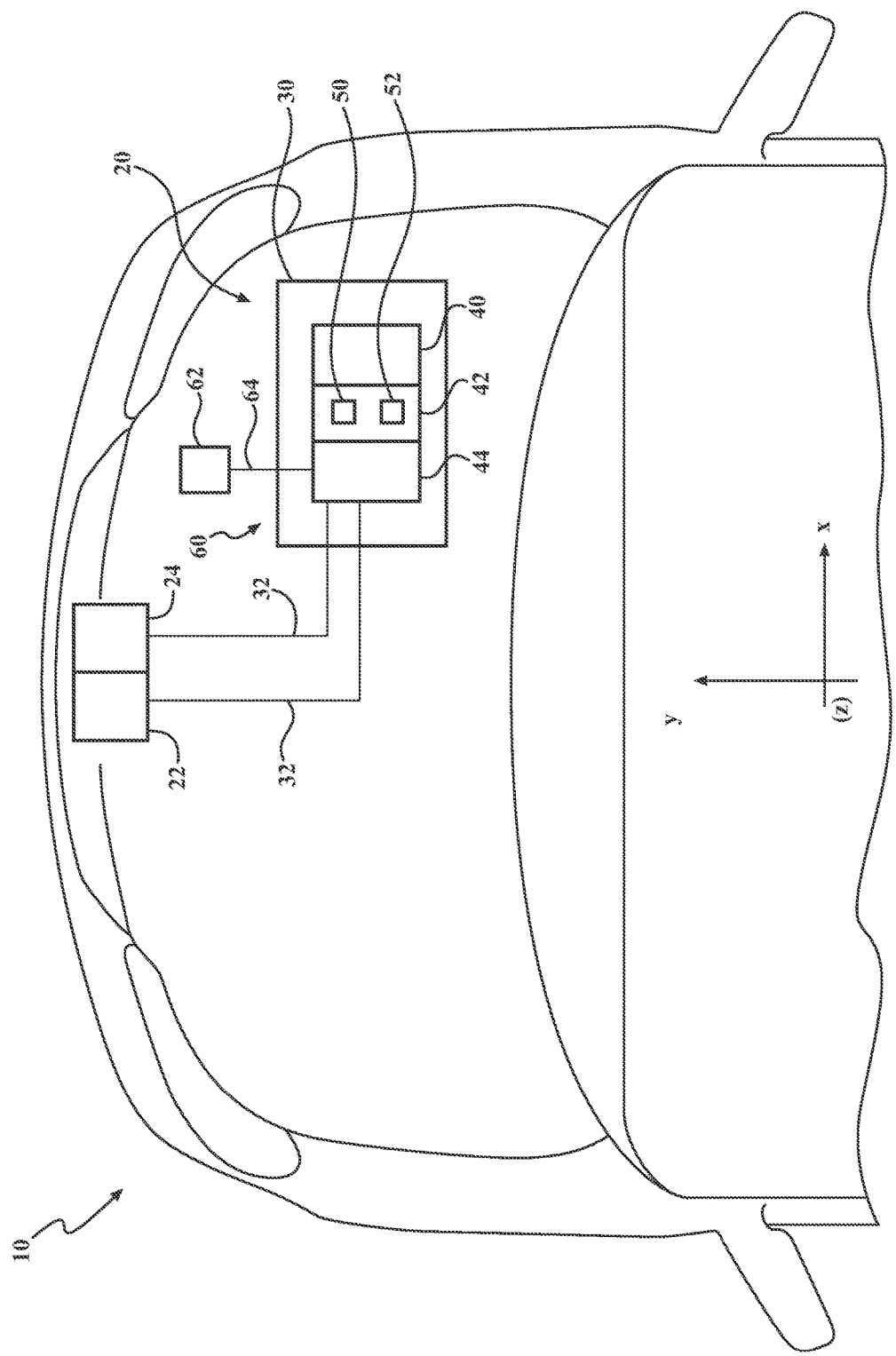
FIG. 1 is a schematic representation of a vehicle including an autonomous operation system whose operation is supported by a 3D sensor.

FIG. 1 shows a vehicle 10 including an autonomous operation system 20 whose operation is supported by a LIDAR sensor 22 and one or more optional auxiliary sensors 24. The LIDAR sensor 22 and the auxiliary sensors 24 are mounted on the vehicle 10 and positioned to have fields of view in the environment surrounding the vehicle 10. Although the vehicle 10 is provided as a non-limiting example of a mobile platform, it will be understood that the autonomous operation system 20 could be implemented in other mobile platforms. Additionally, although the LIDAR sensor 22 is provided as a non-limiting example of a 3D sensor, it will be understood that this description is applicable in principle to other 3D sensors.

The LIDAR sensor 22 is configured to scan the environment surrounding the vehicle 10 and generate signals, including but not limited to 3D points, representing the objects in the environment surrounding the vehicle 10.

Generally, the LIDAR sensor 22 can include a transmitter and a receiver. The transmitter can be a component or group of components operable to transmit laser signals (e.g., laser light energy). As an example, the transmitter may be a laser, laser rangefinder, LIDAR, and/or laser scanner. The laser signals may have any suitable characteristics. In one or more arrangements, the laser signals may be from any suitable portion of the electromagnetic spectrum, such as from the ultraviolet, visible, or near infrared portions of the electromagnetic spectrum. The laser signals may be eye safe.

The laser signals may be transmitted into the environment surrounding the vehicle 10, where they impinge upon objects therein that are located in the path of the laser signals. The laser signals may be transmitted in series of 360 degree spins around a vertical Z axis of the vehicle 10, for example. Generally, when the laser signals impinge upon an object, a portion of the laser signals is returned (e.g., by reflection) to the LIDAR sensor 22. The returned portion of the laser signals can be captured at the LIDAR sensor 22 by its receiver, which may be, or include, one or more photodetectors, solid state photodetectors, photodiodes or photomultipliers, or any combination of these.

Responsive to capturing the returned laser signals, the LIDAR sensor 22 may be configured to output signals representing objects, or the lack thereof, in the environment surrounding the vehicle 10. The LIDAR sensor 22 may include a global positioning system (GPS) or other positioning system for identifying its position, and an inertial measurement unit (IMU) for identifying its pose. According to this configuration, the signals may include 3D points representing the location in space of the points from which the returned laser signals are received, and therefore, the location in space of points of objects on which the laser signals impinged. The LIDAR sensor 22 may determine the location in space of points of objects based on the distance from the LIDAR sensor 22 to the points, as well as the position and pose of the LIDAR sensor 22 associated with the returned laser signals. The distance to the points may be determined from the returned laser signals using the time of flight (TOF) method, for instance. The signals may also represent the locations in space from which no returned laser signals are received, and therefore, the lack of points of objects in those locations in space on which the laser signals would otherwise have impinged.

The signals may further represent other aspects of the returned laser signals, which, in turn, may represent other properties of points of objects on which the incident laser signals impinged. These aspects of the returned laser signals can include their intensity or reflectivity, for instance, or any combination of these.

The auxiliary sensors 24 may also be configured to scan the environment surrounding the vehicle 10 and generate signals representing objects, or the lack thereof, in the environment surrounding the vehicle 10.

The auxiliary sensors 24 may have fields of view individually, or collectively, common to the field of view of the LIDAR sensor 22 in the environment surrounding the vehicle 10. Generally, the auxiliary sensors 24 can be, or include, one or more image sensors configured for capturing light or other electromagnetic energy from the environment surrounding the vehicle 10. These image sensors may be, or include, one or more photodetectors, solid state photodetectors, photodiodes or photomultipliers, or any combination of these. Optionally, the environment can be illuminated by the transmitter of the LIDAR sensor 22. Responsive to capturing light or other electromagnetic energy, the auxiliary sensors 24 may be configured to output signals representing objects, or the lack thereof, in the environment surrounding the vehicle 10.

The vehicle 10 includes a computing device 30 to which the LIDAR sensor 22 and the auxiliary sensors 24 are communicatively connected through one or more communication links 32. Although the computing device 30 and either or both of the LIDAR sensor 22 and the auxiliary sensors 24 may be dedicated to the autonomous operation system 20, it is contemplated that some or all of these could also support the operation of other systems of the vehicle 10.

The computing device 30 may include a processor 40 communicatively coupled with a memory 42. The processor 40 may include any device capable of executing machine-readable instructions, which may be stored on a non-transitory computer-readable medium, for example the memory 42. The processor 40 may include a controller, an integrated circuit, a microchip, a computer, and/or any other computing device. The memory 42 may include any type of computer readable medium suitable for storing data and algorithms. For example, the memory 42 may include RAM, ROM, a flash memory, a hard drive, and/or any device capable of storing machine-readable instructions.

The computing device 30 may also include an input/output interface 44 for facilitating communication between the processor 40 and the LIDAR sensor 22 and the auxiliary sensors 24. Although the computing device 30 is schematically illustrated as including a single processor 40 and a single memory 42, in practice the computing device 30 may include a plurality of components, each having one or more memories 42 and/or processors 40 that may be communicatively coupled with one or more of the other components. The computing device 30 may be a separate standalone unit or may be configured as a part of a central control system for the vehicle 10.

The various algorithms and data for the autonomous operation system 20 and the other systems of the vehicle 10 may reside in whole or in part in the memory 42 of the computing device 30. In operation of the autonomous operation system 20, the signals output by the LIDAR sensor 22 and the auxiliary sensors 24 are stored in the memory 42. As described in additional detail below, the algorithms and data for the autonomous operation system 20 include a detection module 50 and a planning module 52.

Although the various algorithms and data for the autonomous operation system 20 are described with reference to the computing device 30 onboard the vehicle 10 for simplicity, it will be understood that these may reside in whole or in part in a memory of a computing device separate from the vehicle 10. In these cases, the vehicle 10 may also include an integrated mobile communication system 60 with variously configured communication hardware for wirelessly transmitting data between the computing device 30 and a mobile network, such as a cellular network. The mobile communication system 60 and the mobile network together enable the computing device 30 to wirelessly communicate with other devices connected to the mobile network, such as a remote server that may similarly be, or include, a computing device including one or more processors and one or more memories, or another vehicle that may similarly include an object detection system with a computing device including one or more processors and one or more memories.

The mobile communication system 60 of the vehicle 10 may include an integrated mobile network transceiver 62 configured to transmit and receive data over the mobile network. The mobile network transceiver 62 may be communicatively connected to the computing device 30 though a mobile network transceiver communication link 64, with the input/output interface 44 facilitating communication between the processor 40 and the memory 42 and the mobile network transceiver 62. The mobile network transceiver 62 includes a transmitter for wirelessly transferring data from the computing device 30 to the mobile network and a receiver for wirelessly transferring data from the mobile network to the computing device 30.

Figure 2:
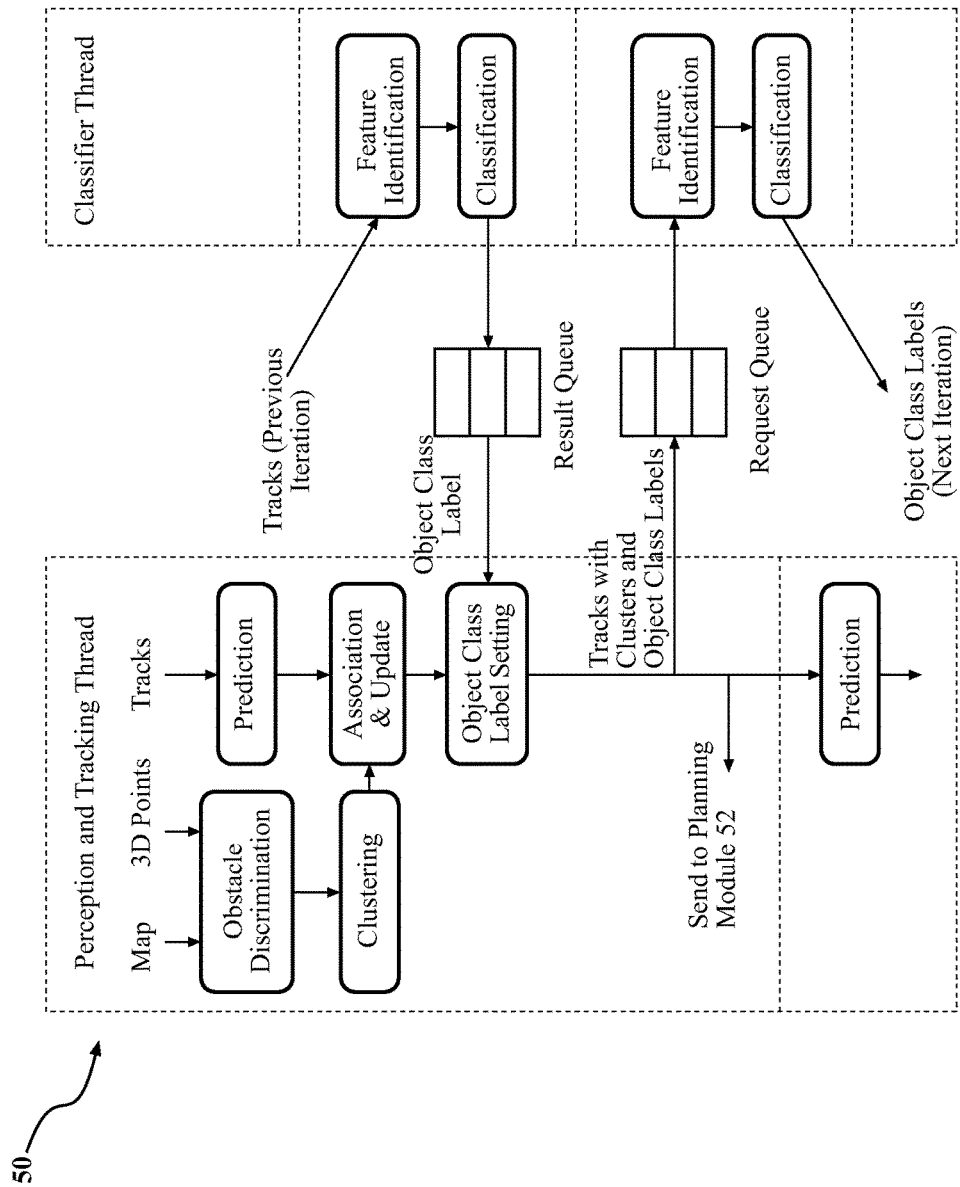
FIG. 2 is a schematic representation of the system architecture of a detection module for the autonomous operation system.

The overall operations of performing object detection in the detection module 50 of the autonomous operation system 20 of the vehicle 10 are introduced with reference to FIG. 2.

As shown, the detection module 50 of the autonomous operation system 20 has a perception and tracking thread and a classifier thread. In the perception and tracking thread, as the LIDAR sensor 22 scans the environment surrounding the vehicle 10, 3D points and other signals output by the LIDAR sensor 22 and representing the objects in the environment surrounding the vehicle 10 are received. A digital map containing a 3D road network with positions for each lane and associated traffic rules (e.g., speed limits, the priority of each road at intersections and roundabouts, and stop line positions) may also be received.

In the perception and tracking thread, the 3D points representing the objects in the environment surrounding the vehicle 10 are received over multiple timesteps each corresponding, for instance, to a 360 degree spin around the vertical Z axis of the vehicle 10. For each of the timesteps, the 3D points may be evaluated to discriminate between 3D points representing obstacles and 3D points representing other objects, such as the ground, and collected into clusters of 3D points representing respective objects in the environment surrounding the vehicle 10. The clustering may implement Markov random field-based clustering, for example.

A given cluster of 3D points at one timestep representing an object in the environment surrounding the vehicle 10 is associated to clusters of 3D points at previous timesteps representing the same object in the environment surrounding the vehicle 10. Over multiple timesteps, a so-called track is generated, which is a temporal series of clusters of 3D points representing the same object in the environment surrounding the vehicle 10. The generation of a track may be implemented by, or from, both particle and Kalman filtering, for example. The tracks, once generated, are updated with new clusters of 3D points representing the object in the environment surrounding the vehicle 10 in subsequent iterations.

The perception and tracking thread and the classifier thread run in parallel and communicate via concurrent result and request queues. The result queue is used to pass classification results from the classifier thread to the perception and tracking thread, while the request queue is filled by the perception and tracking thread with tracks for which classification results are needed.

With this configuration, the detection module 50 may implement an anytime system in which the results of the classifier thread may be prioritized and integrated into the perception and tracking thread to ensure output for real-time decision-making to the planning module 52 despite the analytical costs of the classifier thread.

To implement the anytime system, in the perception and tracking thread, each track may be given a score for prioritization prior to being inserted into the request queue. Tracks having clusters of 3D points in front of and in closest proximity to the vehicle 10 may be given the highest priority, for instance. In these cases, the score given to each track may simply be the distance from the vehicle 10 to a track's clusters of 3D points plus a penalty (e.g., 50 meters) for being behind the vehicle 10, with the tracks with lower scores being prioritized over those with higher scores. Alternatively, or additionally, tracks having clusters of 3D points in certain areas of interest in the environment surrounding the vehicle 10, or tracks whose clusters of 3D points represent an object with an uncertain classification, for instance, could be prioritized over other tracks.

The classifier thread pulls the highest priority track from the request queue, identifies a number of features of the track's clusters of 3D points, identifies classifiers for the track's clusters of 3D points and classifies the object represented by the track's clusters of 3D points based on its most likely object class, as explained in additional detail below, and puts the classifiers and an object class label reflecting the object's resulting classification into the result queue.

After the perception and tracking thread generates a track, it updates its clusters of 3D points with results of the classifier thread from the result queue. Then, all unprocessed tracks are cleared from the request queue, and the next track's clusters of 3D points are pushed onto it. Then, the perception and tracking thread sends each of the tracks to the planning module 52. Each of the tracks has an associated history, so past results of the classifier thread may be used for tracks not addressed in a given iteration.

In general, for a track T with features $x_r$, a classifier may be expressed as the one-vs-all class log-odds $$\mathcal{L}(x; c) = \log \frac{\mathbb{P}(Y = c \mid x_\tau)}{\mathbb{P}(Y \neq c \mid x_\tau)} \quad \text{(Eq. 1)}$$

where Y is the object class label and c is a discrete object class. As explained in additional detail below, these log-odds can be converted to a probability, with the vector containing probabilities for each object class being $$P_\tau = [\mathbb{P}(c_p \mid x_\tau), \mathbb{P}(c_b \mid x_\tau), \mathbb{P}(c_v \mid x_\tau), \mathbb{P}(c_{bg} \mid x_\tau)] \quad \text{(Eq. 2)}$$

using the shorthand $$\mathbb{P}(c \mid x_\tau) = \mathbb{P}(Y = c \mid x_\tau) \quad \text{(Eq. 2.1)}$$

where the given object classes are pedestrian ($c_p$), bicycle ($c_b$), vehicle ($c_v$) and background ($c_{bg}$) object classes, respectively. This vector, along with the most likely object class for the object represented by the track's clusters of 3D points, as well as typical tracking information such as position, velocity, and size of the object, are passed to the to the planning module 52.

In the autonomous operation of the vehicle 10 by its autonomous operation system 20, the classification results from the classifier thread advantageously allow the planning module 52 to address the range of real world traffic situations otherwise faced by human drivers, such as interactions between pedestrians, bicycles and other vehicles. Addressing interactions between the vehicle 10 and pedestrians and bicycles is particularly important given the desire to ensure safety for occupants of the vehicle 10, pedestrians and operators of bicycles, the potential for large speed differentials and sudden relative lateral motions between the vehicle 10 and pedestrians and bicycles, and the relative vulnerability of pedestrians and operators of bicycles. Among other things, proper classification of these and other objects in the environment surrounding the vehicle 10 may, for example, provide information to the planning module 52 used in the determination of how much leeway to give the objects while they are being passed, or, in the determination of whether to pass those objects in the first place.

Figure 3:
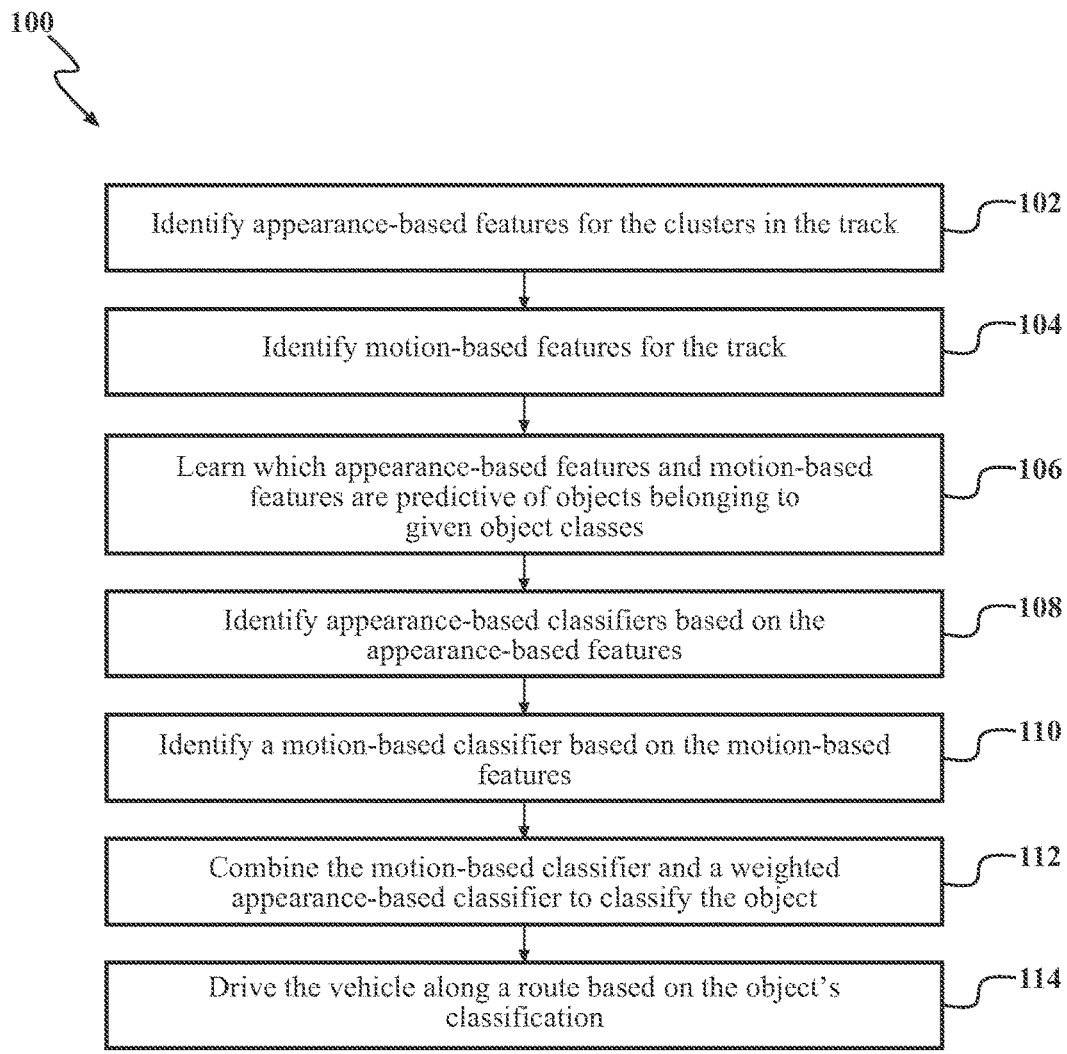
FIG. 3 is a flowchart showing the operations of a process for a classifier thread in the detection module.

The operations of a process 100 for the classifier thread in the detection module 50 of the autonomous operation system 20 of the vehicle 10 are shown in FIG. 3.

As described below, the process 100 culminates in the combination of cluster-based classifiers identified based on local features for a track's clusters of 3D points, or cluster features, and a track-based classifier based on the global features for the track itself, or holistic features.

In general, the cluster features are based on the track's clusters of 3D points, which change from one timestep t to the next with changing distances, viewpoints and orientation of the LIDAR sensor 22, among other things. The cluster features may, for example, correspond in whole or in part to the appearance of the track's clusters of 3D points. For the track, there is a local, or cluster, feature set $z_{1:T}$ for timesteps 1 through T.

In general, the holistic features are higher level summary statistics of the object represented by the track's clusters of 3D points. The holistic features may, for example, correspond in whole or in part to the motion of the object represented by the track's clusters of 3D points. For the track, there is a single global, or holistic, feature set co. With both the cluster feature set $z_{1:T}$ and the single holistic feature set co, the feature set for the track at T is $x_T = z_{1:T}, \omega$.

In operation 102, the local features for a track's clusters of 3D points, or cluster features, are identified, and in operation 104, the global features for the track itself, or holistic features, are identified. In the process 100, for the track, each of the resulting feature sets corresponds to a classifier, so there will be T cluster-based classifiers and one track-based classifier incorporated into the object's ultimate classification.

The local features for a track's clusters of 3D points, or cluster features, may be identified, for instance, from spin images and histogram of oriented gradients (HOG) features derived from virtual orthographic images of the track's clusters of 3D points. In general, this identification requires the track's clusters of 3D points to be oriented consistently, which can be accomplished by estimating the principle direction of each of the track's clusters of 3D points.

Figure 4A:
FIGS. 4A and 4B show example estimations of the principle direction of a cluster of 3D points representing a vehicle.

With the vehicle 10 driving on relatively flat ground as the LIDAR sensor 22 scans the environment surrounding the vehicle 10, the Z axis can be assumed for up, and the principle direction can be searched for in the XY plane. To estimate the principle direction of a given cluster of 3D points, the 3D points may be projected onto the XY plane, and a random sample consensus (RANSAC) may be ran on all of the 3D points to find the direction that the most 3D points align to (e.g., within 10 cm). A threshold of 50% of the 3D points may be used, for example. An example estimation of the principle direction of a cluster of 3D points representing a vehicle when viewed from the side is shown in FIG. 4A, where the principle direction PD is that to which the most 3D points align.

Figure 4B:
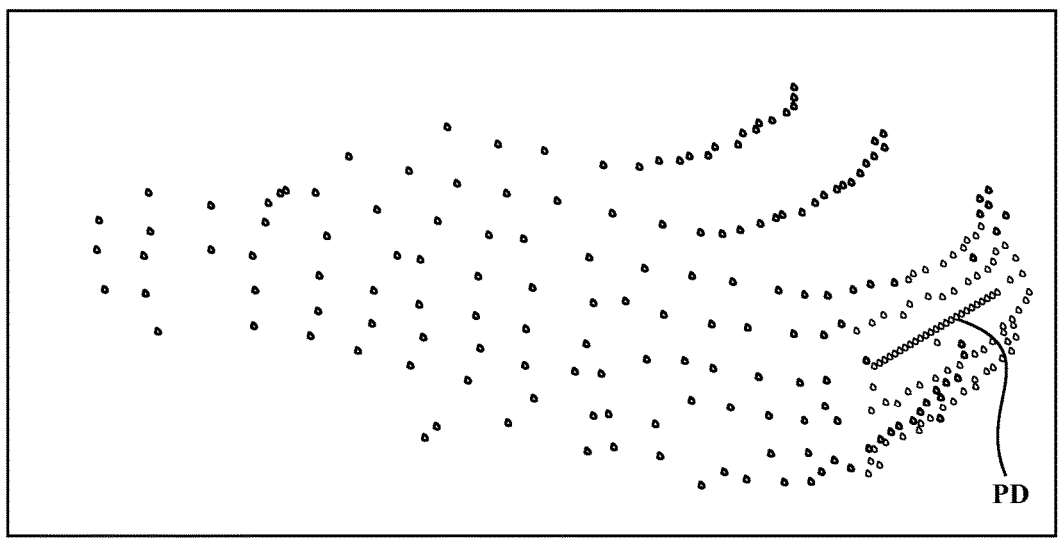

It has been found that this estimation of the principle direction of a cluster of 3D points generally works well for clusters of 3D points representing vehicles and bicycles when viewed from the side, as well as for clusters of 3D points representing pedestrians. As can be seen from the comparison of the estimation of the principle direction PD of a cluster of 3D points representing a vehicle when viewed from the side, shown in FIG. 4A, with the estimation of the principle direction PD of a cluster of 3D points representing a vehicle when viewed from the back, shown in FIG. 4B, this estimation of the principle direction of a cluster of 3D points sometimes fails for clusters of 3D points representing a vehicle when viewed from the back, since the principle direction to which the most 3D points align is perpendicular to the actual orientation of the vehicle. However, if the same estimation of the principle direction of a cluster of 3D points is used in both learning and in classification, the learner will be able to consider local features for a track's clusters of 3D points from both views in classification.

Figure 5:
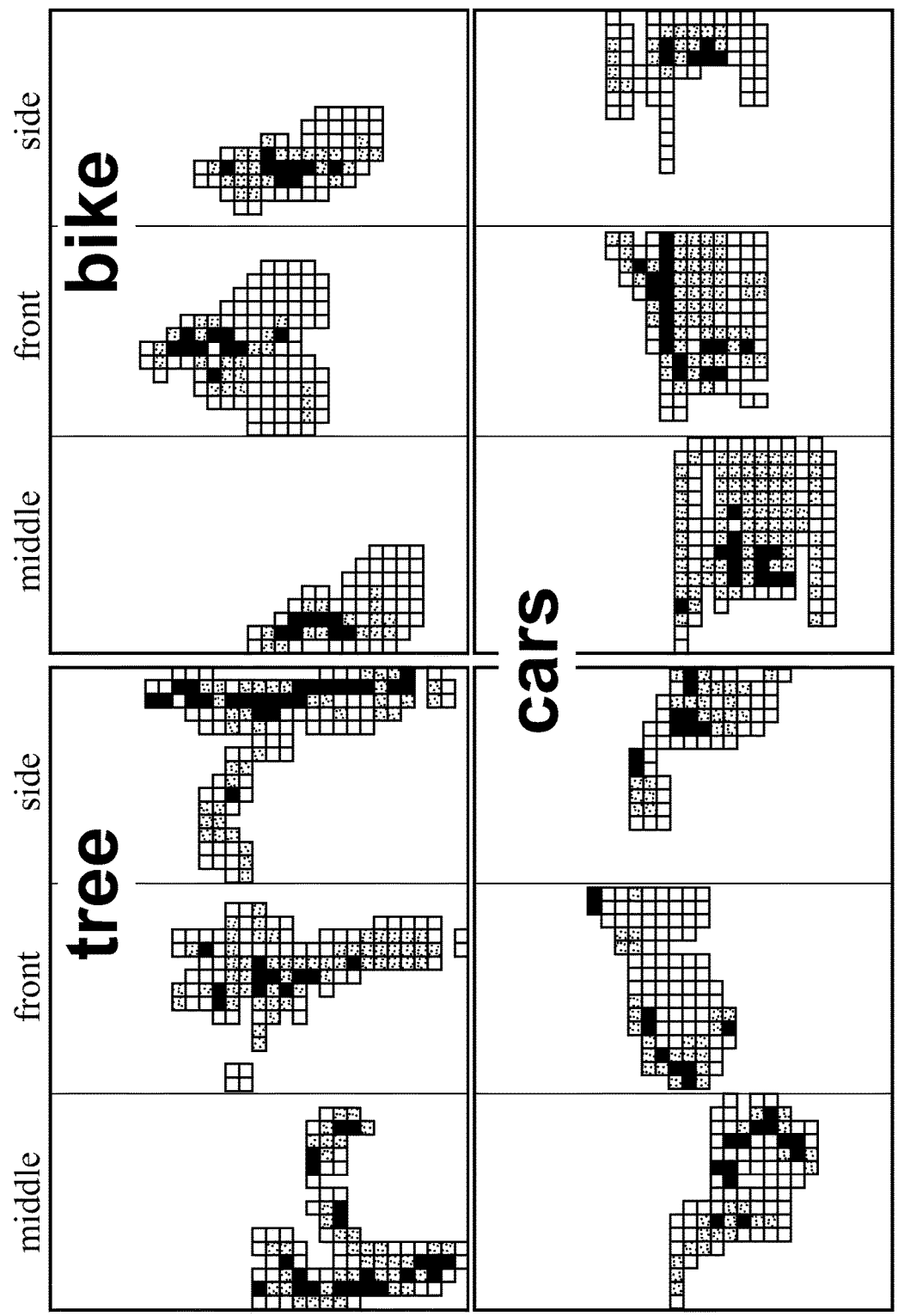
FIG. 5 shows example spin images from clusters of 3D points representing different objects.

Example spin images for a tree, bicycle, sedan and station wagon are shown in FIG. 5. To generate the example and other spin images, a virtual image plane may be spun around the Z axis around the closest 3D points to the center top, front center and side of a given of the track's clusters of 3D points representing an object, accumulating all the 3D points hit along the way into bins.

Figure 6A:
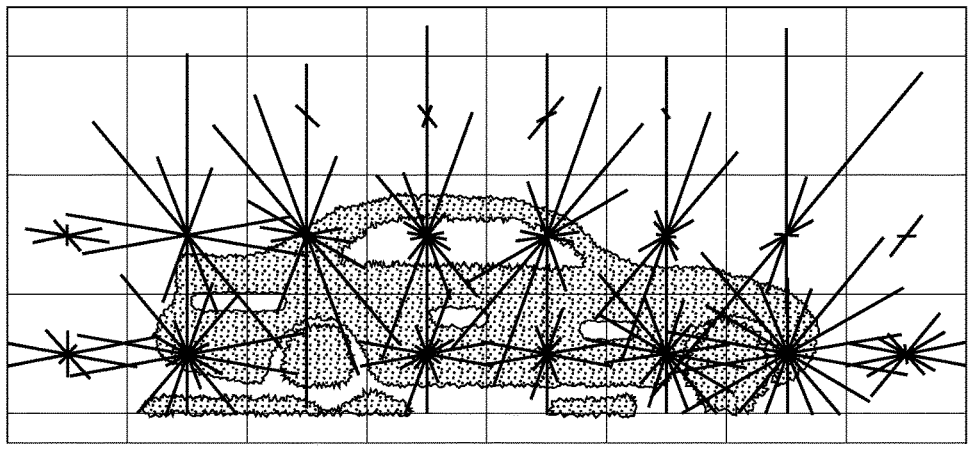
FIGS. 6A-C show example virtual orthographic images of a cluster of 3D points representing a vehicle.
Figure 6B:
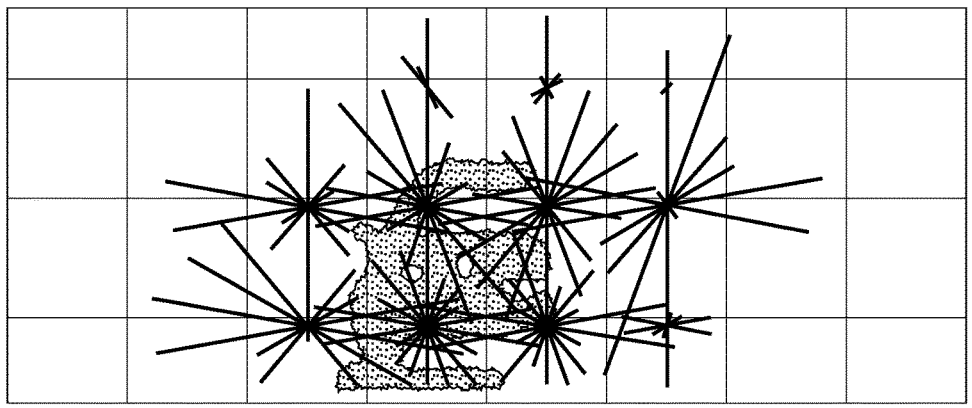
Figure 6C:
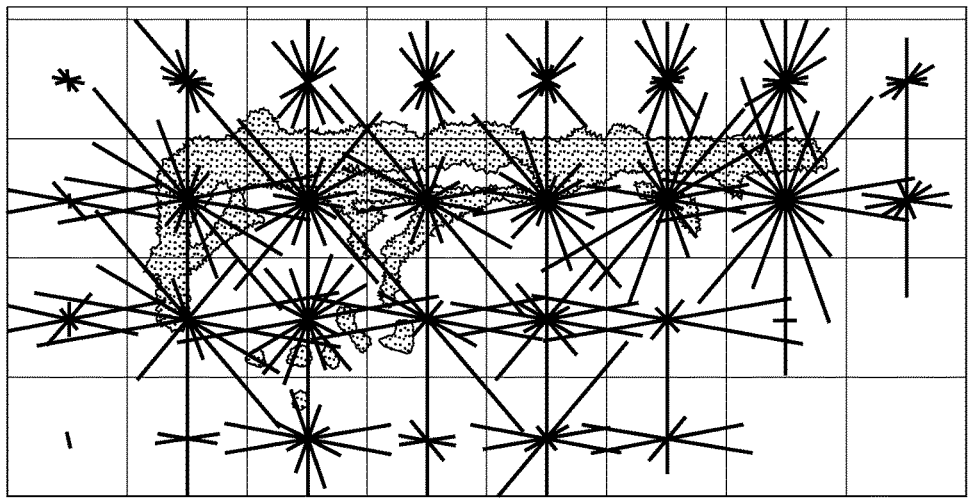

Example virtual orthographic images of a cluster of 3D points representing a vehicle when viewed from the front, side and top of the cluster of 3D points are shown in FIGS. 6A-C, respectively. Each virtual orthographic image is an orthographic projection of the cluster of 3D points oriented along the principal direction of the cluster of 3D points and centered on its bounding box.

Other local features for a track's clusters of 3D points, or cluster features, may be identified for a track's clusters of 3D points. For instance, the estimated principle direction of a cluster of 3D points may be used to orient a bounding box of the cluster of 3D points, and the local features may include, for example, the height, width and length of the bounding box of the cluster of 3D points, as well as the volume of the bounding box of the cluster of 3D points. Additionally, or alternatively, the centroid of the bounding box of the cluster of 3D points may be identified, and the local features may include a distance to the centroid of the bounding box from the LIDAR sensor 22, for instance, or otherwise from the vehicle 10.

The global features for a track, or holistic features, may be, or include, a velocity of the track's clusters of 3D points that represents a velocity of the object represented by the track's clusters of 3D points. Accordingly, the global features for a track may include a maximum velocity of the track's clusters of 3D points or a maximum velocity of the track's clusters of 3D points, or both, for instance. Alternatively, or additionally, the global features for a track may be, or include, an acceleration of the track's clusters of 3D points that represents an acceleration of the object represented by the track's clusters of 3D points. Accordingly, the global features for a track may include a maximum acceleration of the track's clusters of 3D points or a maximum acceleration of the track's clusters of 3D points, or both, for instance. These and other global features for a track may be identified, for example, using a Kalman filter over the centroids of the track's clusters of 3D points.

Figure 7:
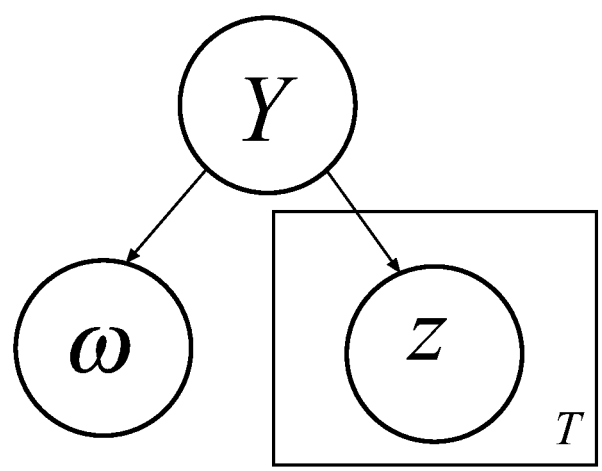
FIG. 7 is an example graphical model encoding the probabilistic independencies between local features for a track's clusters of 3D points and global features for the track.

In operation 106, it is learned which local features, or cluster features, and which global features, or holistic features, are predictive of objects belonging to the pedestrian ($c_p$), bicycle ($c_b$), vehicle ($c_v$) and background ($c_{bg}$) object classes. FIG. 7 is an example graphical model encoding the probabilistic independencies between the local features for a track's clusters of 3D points, or cluster features, and the global features for the track, or holistic features. The learning in operation 106 may implement a decision-tree-based Gentle ADABoost.

In operation 108, cluster-based classifiers are identified based on the local features for a track's clusters of 3D points, or cluster features, and in operation 110, a track-based classifier is identified based on the global features for the track itself, or holistic features.

The cluster-based classifier and the track-based classifier may generally be predictions of which of the pedestrian ($c_p$), bicycle ($c_b$), vehicle ($c_v$) and background ($c_{bg}$) object classes that the object represented by the track's clusters of 3D points belongs to.

In one example, the cluster-based classifier and the track-based classifier may be expressed as a one-vs-all log-odds that the object belongs to one of the pedestrian ($c_p$), bicycle ($c_b$), vehicle ($c_v$) and background ($c_{bg}$) object classes. According to this example, in general, a strong classifier H may be given by the sum of K weak classifiers h $$H(x, c) = \sum_{k=1}^{K} h_k(x, c) \tag{Eq. 3}$$

where the weak classifiers h are regression trees of limited depth, using the local features and the global features for splits. This outputs real values, and the sum of the weak classifiers h may be directly used as opposed to a discrete output sign(H(x,c)). In the limit, the sum of the weak classifiers h converges to the log-odds $\mathcal{L}$(x,c). Using the Gentle AdaBoost, as implemented in OpenCV, these log-odds may be identified for both the cluster-based classifiers and the track-based classifier for the pedestrian ($c_p$), bicycle ($c_b$) and vehicle ($c_v$) object classes.

In operation 112, the cluster-based classifiers and the track-based classifier are combined to classify the object represented by the track's clusters of 3D point based on its most likely object class apparent from the combined cluster-based classifiers and track-based classifier.

To identify the log-odds for a track of length T, for a specific object class c, there are T+1 classifier results from the T cluster-based classifiers and the single track-based classifier. As described below, these may be combined, for instance, using a variation of the normalized Discrete Bayes Filter (DBF) that weighs the cluster-based classifiers based on the amount of information on the cluster of 3D points from which they are identified.

To simplify notation, the combination is described for one object class c, and the object class notations are omitted below. Accordingly, the log-odds ratio is $\mathcal{L}$(x). As used below, $\mathcal{L}_0$ is the log prior odds, and equals log $$\frac{\mathbb{P}(Y = c)}{\mathbb{P}(Y \neq c)}, \mathcal{L}_0^C$$

is an empirical estimate of log prior odds for the cluster-based classifier, $\mathcal{L}_0^H$ is an empirical estimate of log prior odds for the track-based classifier, $H^C$ is the cluster-based classifier that returns the log-odds as identified for the local features for a track's clusters of 3D points, or cluster features, and $H^H$ is the track-based classifier that returns the log-odds as identified for the global features for a track, or holistic features.

Although the example graphical model in FIG. 7 assumes conditional independence between the local features for a track's clusters of 3D points, or cluster features, and the global features for a track, or holistic features, a more sophisticated model is described below. To begin with, however, assuming this conditional independence, to identify the log-odds $\mathcal{L}(\omega, z_{1:T})$ given all local features for a track's clusters of 3D points and the global features for a track over all timesteps (from 1 to T) for the track, and using Bayes rule:

$$\mathcal{L}(\omega, z_{1:T}) = \log\frac{\mathbb{P}(Y = c \mid \omega, z_{1:T})}{\mathbb{P}(Y \neq c \mid \omega, z_{1:T})} \quad \text{(Eq. 4)}$$

$$= \mathcal{L}_0 + \log\frac{\mathbb{P}(\omega, z_{1:T} \mid Y = c)}{\mathbb{P}(\omega, z_{1:T} \mid Y \neq c)}$$

$$= \mathcal{L}_0 + \log\frac{\mathbb{P}(\omega \mid Y = c)}{\mathbb{P}(\omega \mid Y \neq c)} + \sum_{t=1}^{T}\log\frac{\mathbb{P}(z_t \mid Y = c)}{\mathbb{P}(z_t \mid Y \neq c)}$$

$$= \mathcal{L}(\omega) + \sum_{t=1}^{T}(\mathcal{L}(z_t) - \mathcal{L}_0)$$

$$\approx H^H(\omega) + \sum_{t=1}^{T}(H^C(z_t) - \mathcal{L}_0^C)$$

This has the effect of placing unequal weight on the contribution of the track-based classifier, depending on the length of the track. Adding normalization term:

$$H^H(\omega) + \frac{1}{T}\sum_{t=1}^{T}(H^C(z_t) - \mathcal{L}_0^C) \quad \text{(Eq. 5)}$$

This still has the effect of placing equal weight on every cluster-based classifier. Although this would be correct if the cluster-based classifiers accurately predicted which of the object classes that the object represented by the track's clusters of 3D points belongs to in all cases, it has been found that the predictive accuracy of the cluster-based classifiers significantly increases with increasing amounts of information on the cluster of 3D points from which they are identified. In most instances, the amounts of information on the cluster of 3D points from which a given cluster-based classifier is identified is, or is associated with, the amount of 3D points in the cluster. In this or other instances, increasing amounts of information on these clusters of 3D points may be the product of closer proximity between the vehicle 10 and the object represented by the cluster of 3D points.

Accordingly, a weighing factor $\alpha_t$ may be applied to the cluster-based classifiers to down-weight the cluster-based classifiers with decreasing amounts of information on the cluster of 3D points from which they are identified, or up-weight the cluster-based classifiers with increasing amounts of information on the cluster of 3D points from which they are identified, as the case may be:

$$H^H(\omega) + \frac{1}{T}\sum_{t=1}^{T}\alpha_t(H^C(z_t) - \mathcal{L}_0^C) \quad \text{(Eq. 6)}$$

Figure 8:
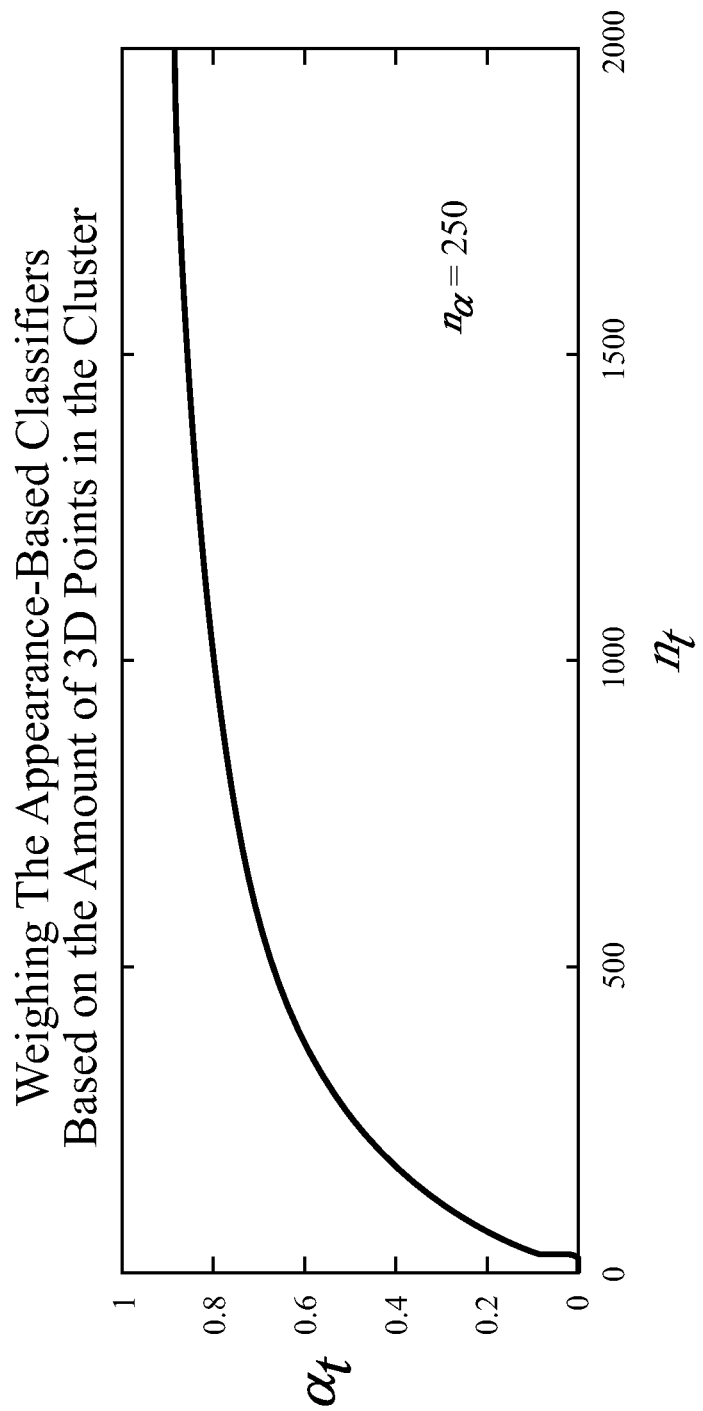
FIG. 8 shows aspects of an example weighing factor for a cluster-based classifier.

As shown with additional reference to FIG. 8, the weighing factor $\alpha_t$ for a given cluster-based classifier may increase with increasing amounts of information on the cluster of 3D points from which it is identified according to $$\alpha_t = 1 - \frac{n_\alpha}{n_\alpha + n_t} \quad \text{(Eq. 7)}$$

where $n_t$ is the number of 3D points in the cluster at time t and $n_\alpha$ is a parameter controlling how quickly $\alpha$ grows with the number of 3D points. In FIG. 8, $n_\alpha$=250, and it can be seen that $0 \leq \alpha \leq 1$ and $\alpha$=0.5 when $n_t$=$n_\alpha$.

Additionally, or alternatively, thresholds can be defined and enforced for the amounts of information on the cluster of 3D points from which a given cluster-based classifier is identified. These thresholds may be defined and enforced, for instance, on the amount of 3D points in the cluster (e.g., 25 3D points), the proximity between the vehicle 10 and the object represented by the cluster of 3D points (e.g., 30 meters), or both, and if the thresholds are not satisfied, the cluster-based classifier can be weighted to zero, for example, by setting the log-odds associated to the cluster-based classifier to zero.

Returning again to the discussion of the pedestrian ($c_p$), bicycle ($c_b$), vehicle ($c_v$) and background ($c_{bg}$) object classes, for each track and timestep, with features $\omega$, $z_{1:T}$, the above classification framework may be applied to the pedestrian ($c_p$), bicycle ($c_b$) and vehicle ($c_v$) object classes, giving the one-vs-all log odds $$\mathcal{L}(\omega, z_{1:T}; c_p), \mathcal{L}(\omega, z_{1:T}; c_b), \mathcal{L}(w, z_{1:T}; c_v) \quad \text{(Eq. 8)}$$

predicting which of the pedestrian ($c_p$), bicycle ($c_b$) and vehicle ($c_v$) object classes that the object represented by the track's clusters of 3D points belongs to. This may be converted to a probability by solving $$\mathbb{P}(Y = c \mid \omega, z_{1:T}) = \frac{e^{\mathcal{L}(\omega, z_{1:T}; c)}}{1 + e^{\mathcal{L}(\omega, z_{1:T}; c)}} \quad \text{(Eq. 9)}$$

for the probability of which of the pedestrian ($c_p$), bicycle ($c_b$) and vehicle ($c_v$) object classes that the object represented by the track's clusters of 3D points belongs to. For the background ($c_{bg}$) object class:

$$\mathbb{P}(Y=c_{bg}|\omega,z_{1:T})=1-\Sigma_{c \in c_p, c_b, c_v} \mathbb{P}(Y=c|\omega,z_{1:T}) \quad \text{(Eq. 10)}$$

With these results from the classifier, the object represented by the track's clusters of 3D points may be classified as belonging to its most likely object class. In operation 114, the planning module 52 may plan how to drive the vehicle 10 along a travel route based on the object's classification while avoiding the object, and the autonomous operation system 20 of the vehicle 10 can drive the vehicle 10 along the route according to the plan.

Figure 9:
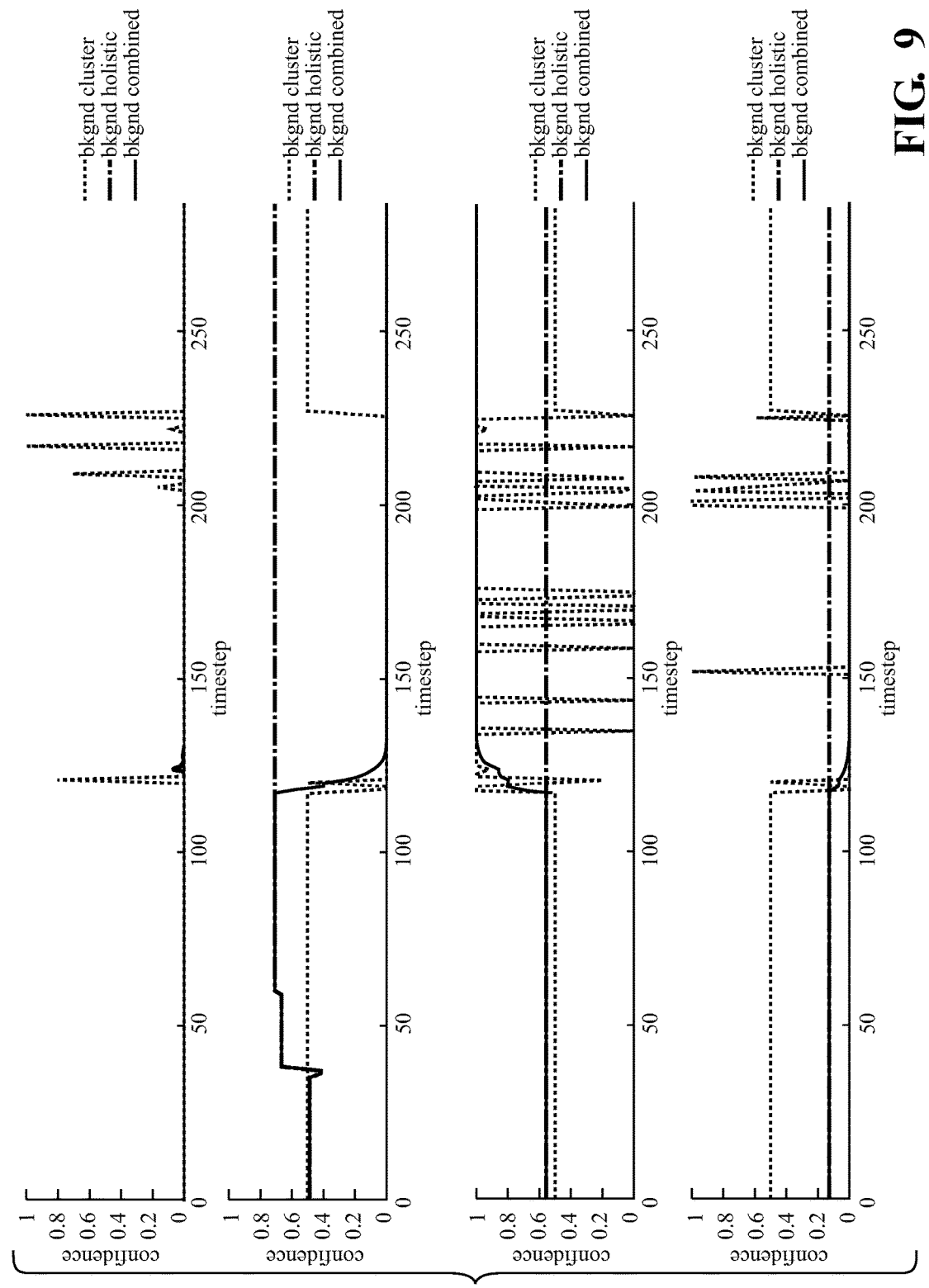
FIG. 9 shows aspects of a classifier confidence over time for track.

FIG. 9 shows the classifier confidence over time for an example track in a cases where the object represented by the track's clusters of 3D points is a bicycle. The solid lines show the confidence for the combined results from the classifier, while the dashed lines show the confidence for the cluster-based classifiers and the dashed-dot lines show the confidence for the track-based classifiers, for each of the pedestrian ($c_p$), bicycle ($c_b$), vehicle ($c_v$) and background ($c_{bg}$) object classes. For the first 120 timesteps, only the track-based classifier contributes to the classification of the object because there are too few 3D points in the clusters (i.e., fewer than 25). The object is initially classified as bicycle, for the first 40 timesteps, but then is misclassified as car at a distance of 82 meters, for the next 80 timesteps, until there are enough 3D points to use the cluster-based classifiers at a distance of 40 meters, at which point the bicycle ($c_b$) object class quickly wins out and remains represented in the combined results of the classifier despite several cluster misclassifications later.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of autonomous driving, comprising:
    generating, with a 3D sensor, 3D points representing objects in an environment surrounding a vehicle;
        identifying, with a computing device, from the 3D points, a temporal series of clusters of 3D points representing the same object in the environment surrounding the vehicle as a track;
        identifying, with a computing device cluster-based classifiers for the object based on identified local features for the clusters in the track;
        identifying, with a computing device track-based classifiers for the object based on identified global features for the track;
        combining, by using the computing device, the cluster-based classifiers and the track-based classifiers to classify the object, with the cluster-based classifiers being weighted based on an amount of information on the clusters from which they are identified, and with the weight increasing with increasing amounts of information; and
        driving the vehicle, using the computing device, along a route based on the object's classification.

2. The method of autonomous driving of claim 1, wherein the amount of information on the clusters is an amount of 3D points in the clusters from which the cluster-based classifiers are identified.

3. The method of autonomous driving of claim 1, wherein when the amount of information on the cluster one of the cluster-based classifiers is below a threshold, the cluster-based classifier is weighted to zero.

4. The method of autonomous driving of claim 1, wherein each cluster-based classifier includes a prediction of which of a plurality of object classes the object belongs to.

5. The method of autonomous driving of claim 1, wherein each cluster-based classifier includes at least one of a one-vs-all log-odds that the object belongs to one of a plurality of object classes or a probability that the object belongs to one of the plurality of object classes.

6. The method of autonomous driving of claim 1, wherein each track-based classifier includes a prediction of which of a plurality of object classes the object belongs to.

7. The method of autonomous driving of claim 1, wherein each track-based classifier includes at least one of a one-vs-all log-odds that the object belongs to one of a plurality of object classes or a probability that the object belongs to one of the plurality of object classes.

8. The method of autonomous driving of claim 1, wherein the combination of the track-based classifiers and the weighted cluster-based classifiers includes a probability of which of a plurality of object classes the object belongs to.

9. The method of autonomous driving of claim 1, wherein the combination of the track-based classifiers and the weighted cluster-based classifiers includes at least one of a one-vs-all log-odds that the object belongs to one of a plurality of object classes or a probability that the object belongs to one of the plurality of object classes.

10. The method of autonomous driving of claim 1, further comprising:
    identifying, with the computing device, the local features based on the clusters in the track.

11. The method of autonomous driving of claim 10, wherein the local features are identified based on an appearance of the clusters in the track.

12. The method of autonomous driving of claim 1, further comprising:
    identifying, with the computing device, the global features based on the track.

13. The method of autonomous driving of claim 12, wherein the global features are identified based on the motion of the clusters in the track.

14. The method of autonomous driving of claim 1, further comprising:
    for each cluster in the track, with the computing device:
        identify a bounding box of the cluster; and
        identify the height, width and length of the identified bounding box as a local feature for the cluster.

15. The method of autonomous driving of claim 1, further comprising:
    for each cluster in the track, with the computing device:
        identify a bounding box of the cluster; and identify the volume of the identified bounding box as a local feature for the cluster.

16. The method of autonomous driving of claim 1, further comprising:
for each cluster in the track, with the computing device:
identify a bounding box of the cluster;
identify a centroid of the identified bounding box; and
identify a distance to the identified centroid of the identified bounding box as a local feature for the cluster.

17. The method of autonomous driving of claim 1, further comprising:
for the track, with the computing device:
identify a velocity of the clusters in the track; and
identify the identified velocity as a global feature for the track.

18. The method of autonomous driving of claim 1, further comprising:
for the track, with the computing device:
identify an acceleration of the clusters in the track; and
identify the identified acceleration as a global feature for the track.

* * * * *

UNITED STATES PATENT AND TRADEMARK OFFICE
CERTIFICATE OF CORRECTION

| | | |
|---|---|---|
| PATENT NO. | : 9,576,185 B1 | Page 1 of 1 |
| APPLICATION NO. | : 14/852806 | |
| DATED | : February 21, 2017 | |
| INVENTOR(S) | : Delp | |

It is certified that error appears in the above-identified patent and that said Letters Patent is hereby corrected as shown below:

In the Specification

Column 7, Line 1: replace "set co" with -- set ω --
Column 7, Line 3: replace "set co" with -- set ω --

In the Claims

Column 11, Line 62: replace "with a computing device" with -- with the computing device, --
Column 11, Line 65: replace "with a computing device" with -- with the computing device, --
Column 12, Line 15: replace "cluster one" with -- cluster from one --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*